(12) United States Patent
Glaser et al.

(10) Patent No.: US 11,788,164 B2
(45) Date of Patent: Oct. 17, 2023

(54) FURNACE FOR PARTIALLY HEATING METAL COMPONENTS

(71) Applicant: BENTELER AUTOMOBILTECHNIK GMBH, Paderborn (DE)

(72) Inventors: Viktor Glaser, Paderborn (DE); Markus Wesling-Schaefers, Geseke (DE); Rainer Lapsien, Bueren-Wewelsburg (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 165 days.

(21) Appl. No.: 17/171,158

(22) Filed: Feb. 9, 2021

(65) Prior Publication Data
US 2021/0246525 A1 Aug. 12, 2021

(30) Foreign Application Priority Data
Feb. 10, 2020 (DE) ...................... 10 2020 103 276.5

(51) Int. Cl.
*C21D 9/46* (2006.01)
*C21D 8/02* (2006.01)
(Continued)

(52) U.S. Cl.
CPC ................. *C21D 9/46* (2013.01); *C21D 1/18* (2013.01); *C21D 1/667* (2013.01); *C21D 8/0221* (2013.01);
(Continued)

(58) Field of Classification Search
CPC . C21D 1/18; C21D 9/46; C21D 1/667; C21D 9/0056; C21D 9/0062; F27B 9/28; F27B 9/12; F27B 2009/124
(Continued)

(56) References Cited

U.S. PATENT DOCUMENTS 3,887,064 A * 6/1975 Brockmann ............ F27B 9/205
198/776
4,527,974 A 7/1985 Carraroli et al.
(Continued)

FOREIGN PATENT DOCUMENTS

CN 110462068 A 11/2019
DE 886013 C 8/1953
(Continued)

OTHER PUBLICATIONS

Office Action for European Application No. 20212470.7 dated Dec. 15, 2022; 14pp.
(Continued)

*Primary Examiner* — Scott R Kastler
*Assistant Examiner* — Michael Aboagye
(74) *Attorney, Agent, or Firm* — HAUPTMAN HAM, LLP (57) ABSTRACT

A continuous furnace for the heat treatment of steel sheets, such as hot forming and press hardening, wherein two zones with mutually different temperatures are formed in the furnace, and a separating wall is present between the two zones. A gap is present in the closed state between the steel sheet and the separating wall and a surface cooling nozzle is in the form of a tube, wherein the surface cooling nozzle has outlet openings pointing downwards in the vertical direction and the surface cooling nozzle is arranged in the direction towards a relatively cooler zone.

18 Claims, 6 Drawing Sheets

(51) Int. Cl.
*C21D 1/18* (2006.01)
*C21D 1/667* (2006.01)
*F27B 9/12* (2006.01)
*F27B 9/28* (2006.01)

(52) U.S. Cl.
CPC .................. *F27B 9/12* (2013.01); *F27B 9/28* (2013.01); *F27B 2009/124* (2013.01)

(58) Field of Classification Search
USPC ........................................................ 266/105
See application file for complete search history.

(56) References Cited

U.S. PATENT DOCUMENTS

| | | | | |
|---|---|---|---|---|
| 4,820,150 | A * | 4/1989 | Ushijima | F27B 9/38 |
| | | | | 198/774.1 |
| 10,612,108 | B2 * | 4/2020 | Haslmayr | C21D 1/40 |
| 11,192,164 | B2 * | 12/2021 | Hahn | B21D 43/003 |
| 11,313,003 | B2 * | 4/2022 | Reinartz | C21D 9/48 |
| 11,331,710 | B2 * | 5/2022 | Hielscher | B21D 22/022 |
| 2004/0112485 | A1 | 6/2004 | Reinhold et al. | |
| 2012/0097298 | A1 | 4/2012 | Sommer et al. | |
| 2017/0044643 | A1 * | 2/2017 | Ahorner | C21D 11/005 |
| 2020/0040415 | A1 | 2/2020 | Reinartz et al. | |
| 2020/0404151 | A1 | 2/2020 | Reinartz et al. | |
| 2020/0392599 | A1 | 12/2020 | Ooyama et al. | |

FOREIGN PATENT DOCUMENTS

| | | |
|---|---|---|
| DE | 10256621 B3 | 4/2004 |
| DE | 102009015013 A1 | 11/2010 |
| DE | 102011011258 B4 | 5/2013 |
| DE | 102013107870 A1 | 1/2015 |
| DE | 102017107549 A1 | 10/2018 |
| GB | 2108252 A | 5/1983 |
| WO | 2019142783 A1 | 7/2019 |

OTHER PUBLICATIONS

Extended European Search Report of European Application No. 20212470.7 dated Apr. 7, 2021; 18pp.

Office Action for German Application No. 10 2020 103 276.5 dated Oct. 8, 2020; 12 pp.

Chinese Office Action for Chinese Application No. 202011523204.5 dated Sep. 9, 2022; 19pp.

Chinese Office Action for Chinese Application No. 2020115232045 dated Jun. 22, 2022; 14pp.

* cited by examiner

FURNACE FOR PARTIALLY HEATING METAL COMPONENTS

RELATED APPLICATIONS

The present application claims priority to German Application Number 10 2020 103 276.5.0 filed Feb. 10, 2020, the disclosure of which is hereby incorporated by reference herein in its entirety.

FIELD

The present disclosure relates to a furnace for heating metal components.

BACKGROUND

The heating of metal components for subsequent processing is known. In steel processing, and in the motor vehicle industry, hot forming and press hardening technology is used. Sheet metal blanks or also already formed components are thereby heated at least partially to a temperature greater than AC3 temperature. This is the austenitization temperature. The component is subsequently hot formed and cooled so quickly that a hardening process takes place. A hard material structure, substantially a martensitic material structure, is thereby established in the previously completely austenitized regions.

These components are lightweight owing to a small wall thickness and have high stiffness. However, the high hardness is also accompanied by a susceptibility to brittle fracture or low ductility.

Tailored properties are customized properties of a steel sheet component. There are thus regions of high strength, which have a tensile strength of greater than 1200 MPa, greater than 1400 MPa. Other regions in the component have in comparison a higher ductility and a lower tensile strength of less than 1400 MPa, less than 1200 MPa and less than 1000 MPa. In the regions with lower tensile strength, a softer material structure is established. Constituents of bainite, ferrite and/or pearlite are present in the regions with lower tensile strength, so that these regions with a softer material structure have fewer and/or even no martensite portions.

In order that a lower strength is established in the softer regions, a different thermal treatment is necessary.

Different possibilities for partially tempering the component are known. For example, there is known from DE 102 56 621 B3 a furnace in which there are two different zones, wherein mutually different temperatures prevail in the zones, which then partially temper the component differently.

A disadvantage thereby is that the heat treatment lasts for a certain period of time. This can be from a few seconds to, in a longer continuous furnace, up to several minutes. Within the wall thickness of a sheet metal blank that is to be heat treated, the temperature adapts. This takes place as a result of heat conduction at the transition region between the zone with the higher temperature and the zone with the lower temperature. A temperature difference of, for example, more than 100, more than 200 and even more than 300° C. prevails here. In the zone above AC3 temperature, temperatures of 900° C. or more prevail. In the zone with the lower temperature, a lower temperature relative thereto of, for example, less than 800° C., or also less than 700° C., prevails.

The required sharply delimited transition region of a few millimeters can thus adjust itself within the component, as a result of heat conduction, to one or more dozen centimeters, but this is undesirable.

A further problem is that precoated components, such as components provided with a metallic precoat, are first fully alloyed in order to form an intermetallic phase with the precoat. To that end, it is necessary to completely heat the entire component to above AC3 temperature. However, the blank is then not partially tempered.

SUMMARY

The object of the present disclosure is to show a possible way of partially tempering series-production steel sheet blanks precisely and differently, and optionally to provide the possibility of full alloying.

The furnace for heat treating steel sheets is used for producing components for hot forming and press hardening and is in the form of a continuous furnace. It is thereby possible to treat steel sheet blanks, also called blanks or steel sheet or also component or steel sheet components hereinbelow. In the furnace itself there are formed at least two zones with mutually different temperatures, wherein a separating wall is present between the two zones. A gap is present in the closed state between the steel sheet and the separating wall. A tubular cooling nozzle is further arranged in the furnace. The tubular cooling nozzle is arranged at or in the separating wall and is in the form of a tube having a plurality of outlet openings. The tubular cooling nozzle has openings which point downwards in the vertical direction. The tubular cooling nozzle is arranged above the steel sheet. A cooling medium, such as a gaseous cooling medium, can accordingly emerge from the tubular cooling nozzle onto the steel sheet component. The tubular cooling nozzle is thereby arranged in the direction towards the relatively cooler zone. The tubular cooling nozzle can also be referred to as a linear cooling nozzle. It is accordingly possible to achieve transition regions of the different tempering in the steel sheet with a width of less than or equal to 100 mm.

In addition, it is provided that a surface cooling nozzle is arranged in the relatively colder zone. The surface cooling nozzle is likewise arranged above the steel sheet, based on the vertical direction. The surface cooling nozzle is to be regarded as a plurality of outlet openings, or nozzles, or nozzle openings, which accordingly subject a surface to, or spray a surface with, a cooling medium. The surface cooling nozzle can accordingly be a collection of several dozen or even several hundred cooling outlet openings, or cooling nozzles. The surface cooling nozzle can be in the form of, for example, a plate which has outlet openings and can then subject a large surface to a cooling agent. This surface cooling nozzle can also be formed, for example, by a large number of hoses or tubes which point downwards in the vertical direction and then each have an outlet opening or also a nozzle head as the outlet opening, but in total likewise cover a surface. A further surface cooling nozzle can also be arranged beneath the steel sheet.

The furnace is a continuous furnace, wherein a first zone has a temperature equal to or greater than the AC3 temperature, thus has a temperature greater than 900° C. Relative thereto, a second zone then has a lower temperature.

A third or also further zones can be present, for example the third zone can be provided entirely upstream and have a temperature greater than or equal to the AC3 temperature, in order first to fully alloy a precoat with the blank. This can also be referred to as a pre-alloying section. A steel sheet which is then guided into the two zones arranged next to one another with mutually different temperatures is cooled in the relatively cooler zone. A temperature of, for example, between 400 and 800° C., or between 550 and 700° C., prevails in that zone.

The third or a further, for example fourth or other zone can also be provided entirely downstream of the separate zones with different temperatures, in order to cause homogenization in the temperature exposure again after the separate tempering.

It is accordingly possible with the furnace according to the disclosure, on account of the tubular cooling nozzle at or in the separating wall, to produce a sharply delimited thermal transition region in the steel sheet in order in the following hot forming and press hardening process, to establish in the component two regions with mutually different strengths. The relatively colder region in the steel sheet is in itself tempered homogeneously in conjunction with the surface cooling nozzle. The tubular cooling nozzle ensures a sharply delimited transition region to the region with the higher temperature. The tubular cooling nozzle accordingly provides a type of temperature curtain.

A conventional hot forming and press hardening tool can thereby be used. Special measures or precautions thus do not have to be taken in the hot forming and press hardening tool itself in order to produce mutually differently tempered regions.

In the case of an integrated pre-alloying section, the component does not first have to be cooled again in order subsequently to be partially heated again. Energy can thus be saved, the component can be both fully alloyed and subsequently partially tempered differently.

In at least one embodiment, the tubular cooling nozzle is in the form of a tube. This tube can optionally have additional outlet openings which are arranged at an angle between the vertical direction and the horizontal direction. A cooling medium can accordingly be directed, based on the vertical direction, downwards directly onto the steel sheet. Furthermore, by means of the additional openings, which are arranged directed downwards in the vertical direction at an angle, based on the vertical direction, of plus and/or minus 0 to 70 degrees, it is also possible to thermally act obliquely on the cooler region. As a result, it is possible to establish a sharply delimited transition region between the mutually different regions with different temperatures in the steel sheet blank. The heat conduction which takes place within the transition region in the steel sheet can accordingly be adjusted in the best possible manner in terms of a sharply delimited transition region. Further openings arranged at lateral angles to the vertical direction can also be arranged in the tube.

The tubular cooling nozzle, e.g., the tube, is arranged in or at the separating wall at a lower end, based on the vertical direction, of the separating wall. The tubular cooling nozzle, e.g., the tube, can also be arranged at a horizontal distance of less than 50 mm from the gap at the lower end of the separating wall. This measure also allows the transition region to be adjusted so as to be delimited as sharply as possible.

A recess, such as a shoulder, for receiving the tubular cooling nozzle, or the tube, is formed in the separating wall.

In addition, in order to adjust the temperature in the relatively cooler zone of the furnace, additional jet tubes, such as cooling jet tubes, can be provided. A cooling medium flows through these jet tubes, so that the region of the steel sheet is cooled. The cooling jet tubes are then configured in their function as bodies for heat removal. A corresponding excess temperature in the cooler zone of the continuous furnace is thus removed. For example, a cooling medium can be passed through a jet tube that is actually used for heating, and heat can be removed from the cooler zone via the cooling medium. It is thus possible optionally to reheat the cooler zone slightly, and thus establish a higher temperature, via the cooling medium. It is also possible in the case of non-partial operation, that is to say with completely homogeneous heating, to use the jet tube as a heating tube, so that a higher temperature is likewise established in the zone.

The separating wall itself is vertically displaceable and adjustable. Different thicknesses of the steel sheet, or contours of a possible component, can accordingly be optimally adjusted in terms of the presence of a gap. Alternatively or in addition, however, the separating wall is also horizontally displaceable or adjustable. As a result, it is possible to adjust the transition region and thus the respective sizes of the regions with mutually different temperatures of the steel sheet blank to the required properties. The displaceability also permits the conventional mode of operation of the furnace without partial cooling. In this case, the separating wall would be raised as far as possible in the vertical direction, thus it would in effect scarcely be present in the furnace.

A conveyor system is further arranged in the furnace itself. The conveyor system has lifting beams and/or oscillating conveyors. Accordingly, in contrast to conveyor rollers, no heat dissipation or heat influencing takes place via the conveyor system itself. Each contact region with the steel sheet thus has its individual temperature, namely both in the longitudinal direction and in the transverse direction. This measure too again promotes the purposive establishment of different temperature regions in the steel sheet. In the transverse direction relative to the direction of material flow through the continuous furnace, the elements of the conveyor system that are in contact with the sheet metal blank (lifting beams, travel beams, chains) are physically separated. Accordingly, there is also thermal separation, so that heat conduction in the transverse direction through the conveyor system is, where possible, not facilitated and/or is avoided.

In at least one embodiment, the conveyor system has lifting beams and travel beams. The lifting beams thereby touch the component, and consequently the steel sheet. The travel beams are provided for progressive movement through the furnace. The travel beams can perform an oscillating movement, consequently they are moved forward and backward. To that end, the travel beams are mounted on an oscillating chain. However, the travel beams or travel beam portions can also be mounted on drive rollers. By changing the direction of rotation of the drive rollers, a forward or backward movement is then made possible. A further alternative provides that drive rollers have spacers directed in the radial direction over the surface of the drive rollers. Accordingly, when the lifting beams are lifted, the sheet metal blank is not moved in the direction of material flow but is held by the lifting beams. When set down, the sheet metal blank is moved in the direction of material flow via the spacers of the drive rollers. The spacers on the drive rollers are in turn separated in the transverse direction, so that no heat conduction occurs there. The oscillating chain can revolve in the furnace but also only through the length of the furnace, in order then to permit the forward and backward movement of the travel beams via the oscillating chain. The component itself is lifted by the lifting beams and then lies in the lifted state on the lifting beams. The travel beams can then perform a forward or backward movement independently of the component and also independently of the lifting beams. If, for example, the travel beam is moved backward, the lifting beams are lowered and the component in the form of the steel sheet is then deposited on the travel beams and transported further in the direction of material flow. If the oscillating movement in the direction of material flow is terminated, the steel sheet is again lifted by the lifting beams and the travel beams are moved backward. The component is subsequently deposited again and the travel beams again move in the direction of material flow through the furnace. Successive transport, or sequential transport, through the continuous furnace is thus made possible.

The travel beams perform their oscillating movement definitively in a thermal zone of the continuous furnace, so that the component is not adversely influenced in the differently tempered zones by the travel beams or lifting beams.

The lifting beams, but also the travel beams, are separated in the direction of material flow and no negative heat effect takes place there. When a differently tempered zone is arranged upstream or downstream, in each case based on the direction of material flow, of the relatively colder zone, the lifting beams nevertheless remain substantially in their thermal portion or in their zone and thereby assume the temperature of the zone. The lifting beams thus do not experience any substantial temperature change and specifically do not pass completely first through one zone and then experience a different temperature relative thereto in a further zone. This also promotes the establishment of a precise temperature in the blank.

The colder zone has at least three travel beams, or a length of at least three lifting beams. It is thus ensured that at least a lifting beam and/or travel beam that is arranged in the middle always remains wholly in the colder zone during the oscillating movement. The lifting beam or travel beam at the entry and the lifting beam at the exit, in each case based on the direction of material flow, of the colder zone can be moved at least in part into a differently tempered zone. The transport system through the continuous furnace can also be regarded as a separate inventive concept. Consequently, the transport system can also be arranged without a surface cooling nozzle or tubular cooling nozzle passing through the furnace.

Another measure is that a separating wall is arranged beneath the steel sheet, based on the vertical direction. A tubular cooling nozzle can likewise be provided as an alternative to or in addition to the lower separating wall. This is made possible on the one hand by a conveyor system having lifting beams or oscillating conveyors since, in contrast to transport rollers, a lower separating wall can thus also be arranged along the transport direction. The temperature in the different regions can again be optimally adjusted and the transition region can be produced in a sharply delimited manner. Likewise optionally in addition, the lower side of the steel sheet can be cooled by a lower surface cooling nozzle. There is additional cooling from beneath in the case of a modular design of a continuous furnace with a plurality of zones. A first furnace module is provided directly downstream of a homogeneously tempered third furnace zone in the direction of material flow, so that a maximum cooling effect is achieved in the second zone. At least one embodiment has additional cooling from beneath can likewise be used for a batch furnace or chamber furnace, that is to say for furnace types in which the sheet metal blank is not moved continuously.

Consequently, all the described measures in respect of the tubular cooling nozzle and/or the surface cooling nozzle, both from above and from beneath, are an independent inventive concept in a general furnace. That is to say, it does not have to be arranged in a continuous furnace but can also be formed in a batch furnace or multiple hearth furnace.

A centering system is arranged at the conveyor system or integrated into the conveyor system. This measure also allows the steel sheet to be tempered to be optimally oriented, to pass through the mutually different temperature zones in the furnace, and thus allows the transition region to be established exactly at the specified position of the steel sheet. The centering system can be formed, for example, by centering pins or centering pegs. Corresponding centering pins or centering pegs can also be arranged so as to be displaceable relative to the lifting beams or oscillating conveyors.

It is also possible for transport rollers to be arranged at least in longitudinal portions in the continuous furnace as the conveyor system. The transport rollers can be arranged in addition to the oscillating conveyor system, but in this case outside the homogeneously tempered third zone of the continuous furnace (pre-alloying section).

At the entry and/or exit of the continuous furnace, fork-type receivers or the like can be arranged for introducing the blanks or removing the tempered blanks and optionally transferring them directly into a hot forming and press hardening tool and placing them therein.

There is used as the cooling agent a gaseous cooling agent. This is introduced into the tubular cooling nozzle at a pressure of between 5 and 10 bar. The cross-section of the outlet openings becomes continuously smaller from the side of the feed line to the tubular cooling nozzle. A pressure loss due to escaping cooling medium can thus be counteracted. Alternatively or in addition, the cross-section of the tube itself becomes smaller downwards from the feed line, so that here too a pressure loss is compensated for. The feed line itself can be arranged at a respective end of the tube, but also, for example, centrally in a tube. The above-mentioned embodiments then apply correspondingly analogously, since they relate to the coupling of the feed line with the tube. There can be simple outlet openings which have a diameter of from 0.5 to 3 mm. However, other forms of nozzle can also be provided. These are arranged relatively close to one another and at a constant distance from the steel sheet blank, in order to provide a so-called nozzle comb or air curtain.

A further element of the present disclosure is also a method for operating the furnace. The method accordingly comprises producing hot-formed and press-hardened components by the steps:

providing a sheet metal blank of a hardenable steel alloy, having a metallic precoat based on aluminum-silicon, at least partially heating the steel sheet blank to greater than or equal to the austenitization temperature (AC3 temperature) of the steel alloy, fully alloying the precoat, optionally partially post-tempering to a region greater than AC3 temperature and a region below AC3 temperature, transferring to a hot forming and press hardening tool, and hot forming and press hardening in at least one tool stage.

A transition region in the blank of less than 100 mm between 50 and 80 mm, can be tempered by the arrangement according to at least one embodiment by means of the tubular cooling nozzle. This transition region in the blank later also corresponds to the transition region from the hard to the soft region in the hot-formed and press-hardened component that is produced. By means of the cooling concept according to the disclosure, a precise narrow transition region in the blank can be tempered. In the context of the disclosure, a transition region is to be understood as meaning a surface region having a temperature drop from the temperature of the blank in the first zone to the temperature of the blank in the second zone. This transition region is then to be regarded, as a result of the subsequent hot forming and press hardening, as a surface region in which the hardness or tensile strength changes from the hard to the soft region. In the harder region, the component has a tensile strength of greater than or equal to 1200 MPa, greater than or equal to 1400 MPa, or greater than or equal to 1500 MPa. In the softer region, it has a tensile strength of less than 1000 MPa, or between 550 and 750 MPa. The transition region is then the region between these two hardness regions.

The above-described conveying concept with lifting beams and travel beams in the continuous furnace, alternatively also the mentioned centering system in the roller hearth furnace, additionally has the result that the position of the very narrow transition region established in each component also scarcely varies from component to component within a production batch. In other words, both the centering system, but also the use of the mentioned conveying concept, has the result that the position tolerance of the transition region, based on the surface of the sheet metal blank and in the finished component, is less than 30 mm, less than 20 mm. The position tolerance relates to the conveyor system.

In conjunction with the above-mentioned tempering system in respect of the tubular cooling nozzle and the surface cooling nozzle, the position tolerance is then to be understood such that the transition region smaller than 100 mm, between 50 and 80 mm, can be produced in large-scale production with such precision that a deviation in position is less than 30 mm, or less than 20 mm.

BRIEF DESCRIPTION OF THE DRAWINGS

Further advantages, features, properties and aspects of the present are the subject of the following description. The description serves merely for understanding of the. In the figures.

In the figures, the same reference signs are used for identical or similar components, even when a repeat description is omitted for the sake of simplicity.

DETAILED DESCRIPTION

Figures 1A, 1B:
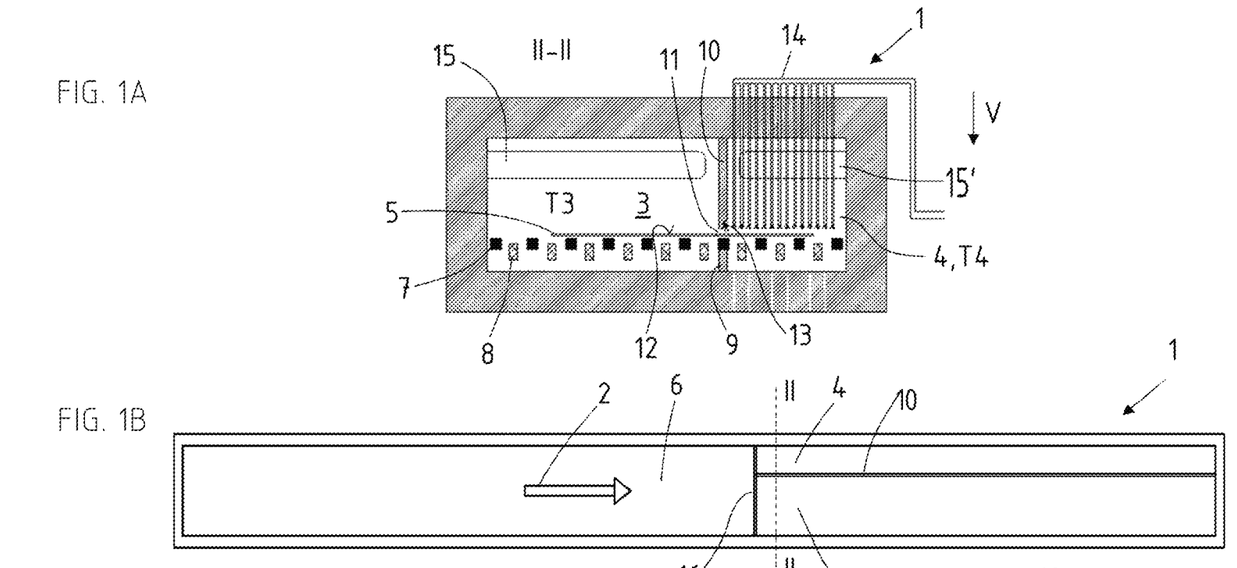
FIG. 1A, FIG. 1B, and FIG. 1C are different views of at least one embodiment of the furnace.
Figure 1C:
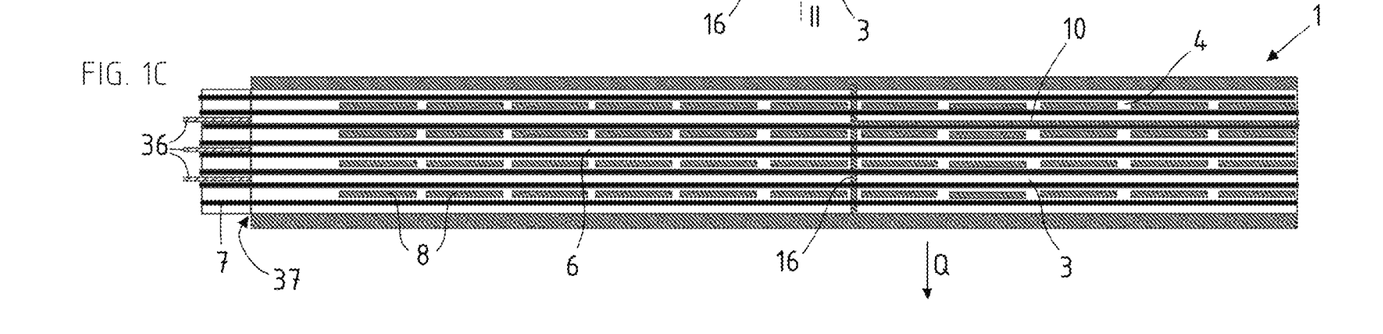

FIG. 1A, FIG. 1B and FIG. 1C show a furnace 1 according to the disclosure in a cross-sectional view and two plan views or longitudinal sections. FIG. 1A shows the cross-sectional view along cutting line II-II in FIG. 1B. FIG. 1B shows a plan view of the furnace 1, divided into different tempering zones with different temperatures, and FIG. 1C shows a plan view with a conveyor system.

According to FIG. 1B and FIG. 1C, the furnace 1 is here in the form of a continuous furnace. It has a conveying direction 2, which is from left to right in the image plane.

In the furnace 1 itself there is formed a first zone 3 in which there prevails a temperature T3 which is greater than or equal to the austenitization temperature. There is further formed a second zone 4, wherein a temperature T4 which is below the AC3 temperature prevails in the second zone 4.

In the furnace 1 there is arranged a steel sheet blank 5, which is conveyed through the interior of the furnace 1 and consequently through the zones 3, 4. According to FIG. 1B, a third zone 6 is provided upstream. The third zone 6 can be in the form of a preliminary temperature zone or also in the form of a full alloying section in order, for example, to carry out pre-heating and/or to carry out full alloying to form an intermetallic phase in the case of a precoated steel sheet blank 5.

In order that the steel sheet blank 5 can be transported through the furnace 1 in the conveying direction or transport direction 2, travel beams, not shown in detail, are arranged on an oscillating chain. According to the longitudinal sectional plan view in FIG. 1C, a plurality of these oscillating chains are arranged parallel to one another passing through the furnace 1. As stated, travel beams, not shown in detail, are then arranged on the oscillating chains. In order that the blank can be lifted so that the travel beam can perform the oscillating movement, lifting beams 8 are further provided. The lifting beams 8 are lowered according to the cross-sectional view of FIG. 1A. Consequently, the blank lies on the travel beams of the oscillating chain. If the lifting beams 8 are then lifted in the vertical direction, the blank is likewise lifted thereby. The oscillating chain can then perform the backward oscillating movement. The travel beams are likewise arranged so as to be physically separate in the conveying direction. The lifting beams 8 are likewise arranged separate from one another in the longitudinal direction through the furnace, as can be seen in FIG. 1C. One or more steel sheet blanks can thus continuously be deposited on the lifting beams or lifted by the lifting beams 8.

Partial lifting beams 8 can be arranged in each case in the longitudinal direction (conveying direction 2). However, they are divided both in the longitudinal direction and in the transverse direction. As a result, it is possible that a lower separating wall 9 can optionally also be provided. Both the deposit rails and the lifting beams 8 are configured so as to be separate from one another in the transverse direction. In the furnace portion in which two partially mutually different temperatures are formed, no disadvantageous heat conduction thus takes place by the transport system.

An introduction system is further arranged in the region of the entry 37 of the continuous furnace 1. The introduction system is formed by fork-type rails 36 which enter the furnace 1 in the longitudinal direction and engage between the oscillating chains, where they then deposit a steel sheet blank, not shown in detail. A similar system can also be arranged at the exit, but this is not shown in detail. As an alternative, however, a gripper system can also be arranged at the exit, that the blanks the tempered steel sheets are introduced directly into a hot forming and press hardening tool.

However, there is formed between the two zones 3, 4 a separating wall 10, which can be raised and lowered in the vertical direction V. Beneath the separating wall 10 there is formed a gap 11, which remains between the lower side of the separating wall and the surface 12 of the blank 5.

In order that a large temperature difference does not occur as a result of heat conduction within the steel sheet blank 5 but also there is no air flow from the warmer first zone 3 into the colder zone 4 at the gap, a tubular cooling nozzle 13 is formed, in the form of a tube. Owing to the outflowing cooling agent, the tubular cooling nozzle 13 forms a type of temperature curtain, consequently a prolongation of the separating wall 10. This allows a corresponding cooling medium or cooling gas to flow onto the steel sheet blank 5. As a result of the respective temperature zone 3, 4, a region with mutually different temperatures is established in the steel sheet blank 5. A transition region in the steel sheet blank 5 between the two regions with mutually different temperatures can accordingly be delimited sharply.

A cooling system in the form of a surface cooling nozzle 14 can optionally further be provided in the second zone 4. In the first zone 3 there is further arranged a jet tube 15 for heating the first zone 3. A separating wall 16 can further be provided, which separating wall partitions the third zone 6 from the first and second zones 3, 4 transversely to the transport direction. The separating wall 16 can also be configured so that it screens the second zone 4 only partially. A body 15' for heat removal can further be provided. This can be a jet tube through which a cooling medium is passed, so that heat is removed from the cooler zone 4 of the furnace.

The separating walls are thermally insulated.

Figure 2A:
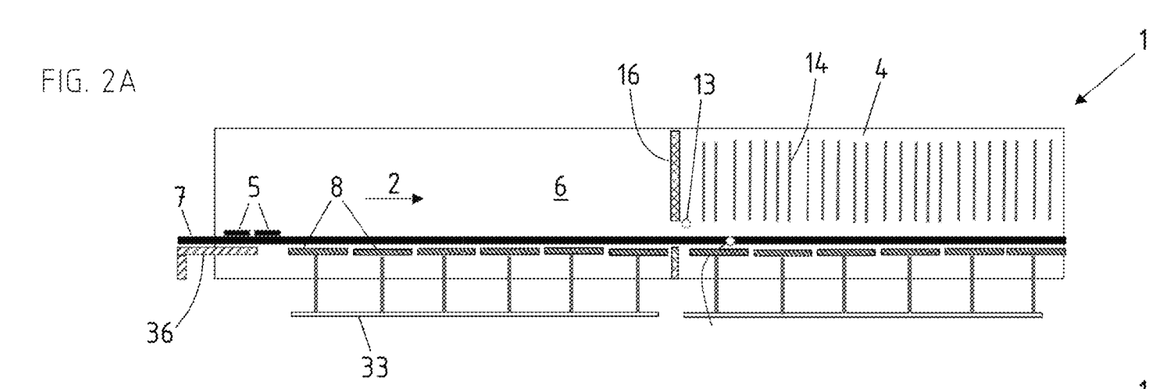
FIG. 2A and FIG. 2B are each a longitudinal sectional view through a furnace with a transport system according to at least one embodiment.
Figure 2B:
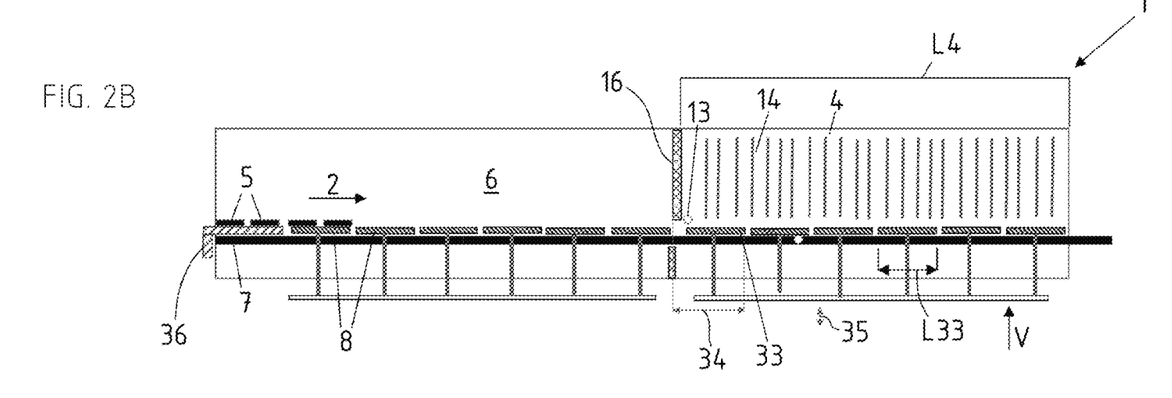

FIG. 2A and FIG. 2B show in each case a vertical longitudinal section through a continuous furnace 1. There are shown in those figures a third zone 6 in the form of, for example, a pre-alloying section and also a zone 4 formed in the transport direction 2 having the surface cooling nozzles 14. There is likewise arranged a tubular cooling nozzle 13 immediately after the entry into the cooler zone 4, consequently after the separating wall 16, which extends in the transverse direction. It will be seen that the lifting beams 8 are located beneath the oscillating chain 7 according to FIG. 2A. The lifting beams 8 themselves are fastened to a beam 33. The beams 33 perform a lifting movement 35. The oscillating section is shown in FIG. 2B. The oscillating chain is here moved by way of example in the transport direction into the continuous furnace 1. The length of the oscillating section is shown at reference numeral 34. The lifting beams 8 are lifted in the lifting direction 35. The oscillating movement would then be carried out in the opposite direction and the lifting beams would then be lowered, so that the steel sheet blanks are taken along with the oscillating movement in the material flow direction. The lifting beams 8 are subsequently lifted again and the oscillating movement begins again. Firstly, the lifting beams 8 each remain in their tempered zone. Consequently, the lifting beams 8 assume the temperature of the zone itself and thus do not adversely influence the steel sheet blank to be heated. The oscillating section is likewise only short, based on the length of the continuous furnace 1, so that the portion of the oscillating chain and/or of the travel beams, not shown in detail, is exposed to very different temperatures, only experiences a very slight oscillating movement. At the latest after a length which corresponds to the oscillating section itself, the next travel beam or portion of the oscillating chain has the temperature of the zone. An adverse temperature effect no longer takes place here. Thus, three lifting beams 8 and/or travel beams are arranged in zone 4 at least in the longitudinal direction. Consequently, three travel beams and/or lifting beams have a length which corresponds to the length L4 of zone 4. It is, however, also possible, as shown here, to arrange more lifting beams 8 and travel beams, not shown in detail, in the length L4. It is thus ensured that, in the entry zone but also in the exit zone of the relatively colder zone 4, not more than a length of one lifting beam 8 or travel beam is subjected to the temperature variations caused by the oscillation into different temperature zones. The following, or upstream, travel beams or lifting beams 8, however, are held in the zone in a temperature-stable manner.

For all the above-mentioned and following examples, the continuous furnace has, for example, an overall length of from 30 to 60 m, from 35 to 45 m, from 32 to 42 m, or 40 m. A cooler zone 4 can have a length L4 in the transport direction of from 15 to 20, from 16 to 18, or 17 meters length.

Figure 3A:
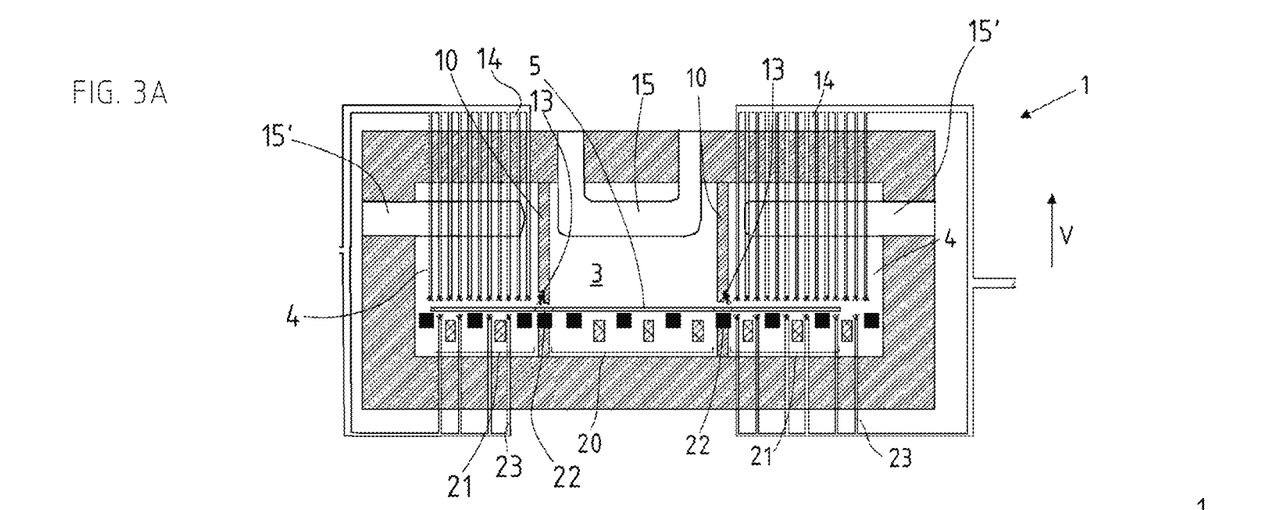
FIG. 3A and FIG. 3B show a furnace, divided into different modules according to at least one embodiment.
Figure 3B:
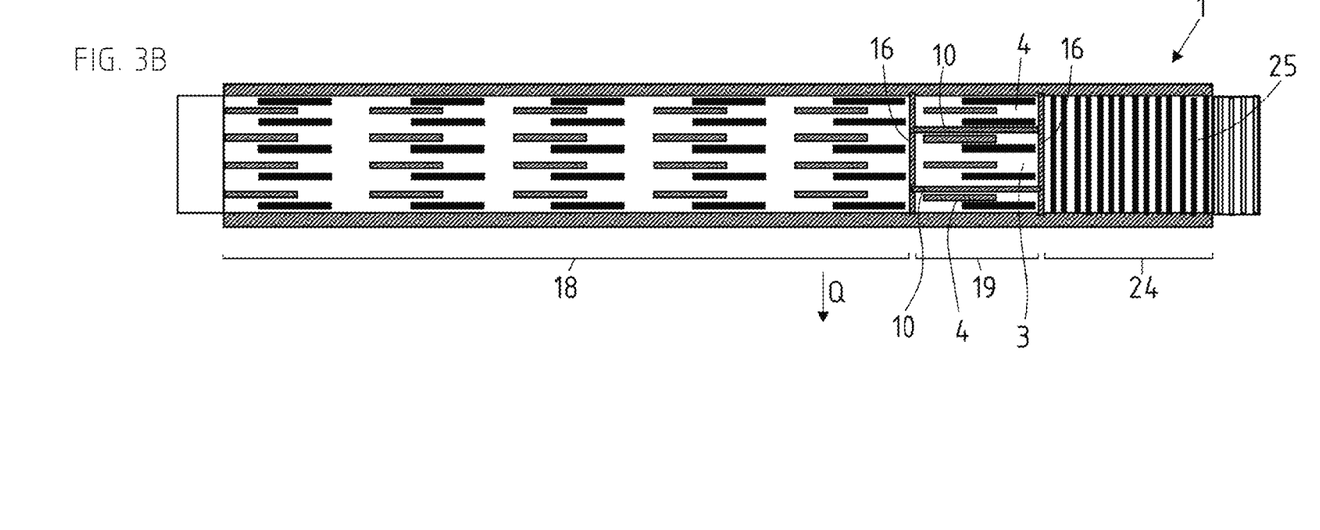

FIG. 3A and FIG. 3B show at least one embodiment of the furnace 1 according to the disclosure. There are hereby arranged a plurality of modules, which can also be in the form of respective furnace modules. A first module 18 serves for full alloying. A precise position orientation is further carried out. A second module 19 can then be used to carry out partial tempering, so that a first zone 3 and a second zone 4 with mutually different temperatures are formed. In the blank, or in the steel sheet, a first region 20 with a temperature greater than or equal to AC3 temperature is then established, as is a second region 21. Between those regions is a transition region 22. The relatively cooler zone 4 is accordingly arranged on the left and right in the transverse direction.

Optionally, it is shown here in FIG. 3A that there is not only formed the cooling system from above, based on the vertical direction V, but a lower cooling system 23 is also provided, which likewise tempers the steel sheet blank 5 from beneath. A more rapid and even more precise temperature adjustment can thereby take place. In combination with the conveyor system according to the disclosure, it is possible to implement the corresponding cooling system 23 from beneath as a surface cooling system. Individual lines can thus extend between the lifting beams 8 and/or oscillating chains 7 and thus subject the lower side of the blank 5 to a cooling agent.

A third module 24 can be provided, in order, for example, to carry out a brief temperature homogenization following the intermediate cooling. Transport rollers 25 can then be formed here.

By way of example, a centering pin 26 is likewise shown in FIG. 3A, which centering pin carries out centering of the steel sheet blank 5. The centering pin 26 can be displaced in the vertical direction relative to the conveyor system but also transversely and longitudinally with respect to the transport direction. The centering pins 26 can also be formed in at least one of the embodiments.

There are further shown in FIG. 3B separating walls 16 which separate the individual modules from one another.

Figure 4:
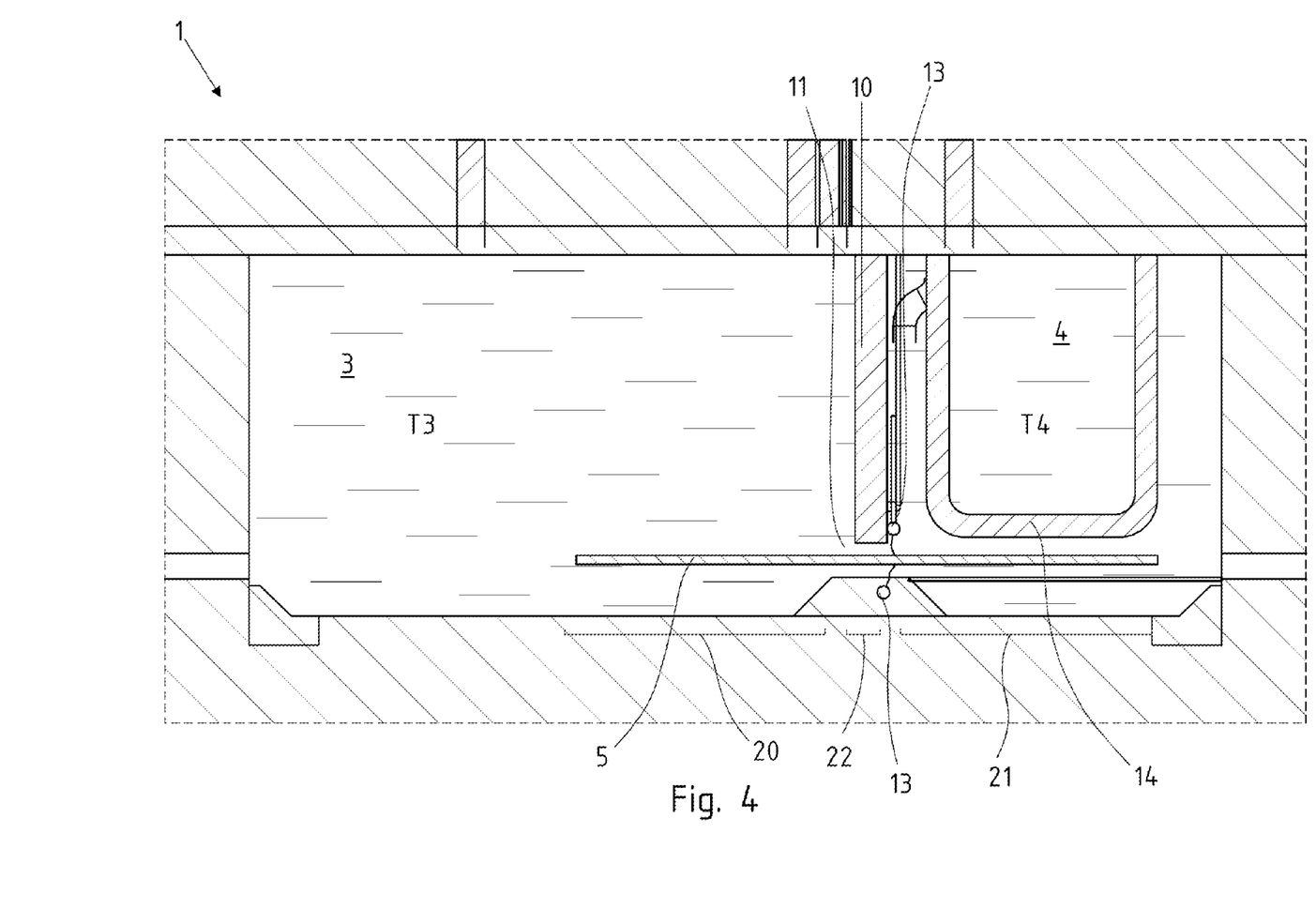
FIG. 4 is a cross-sectional view through a furnace according to at least one embodiment.
Figure 5A:
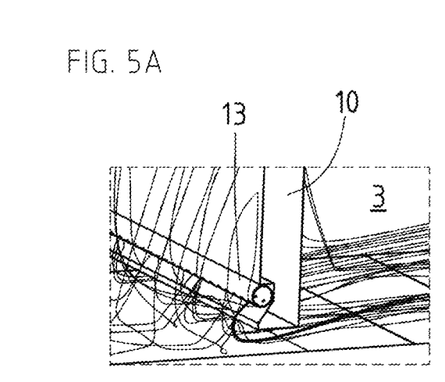
FIG. 5A to FIG. 5F show various flow patterns according to at least one embodiment.
Figure 5B:
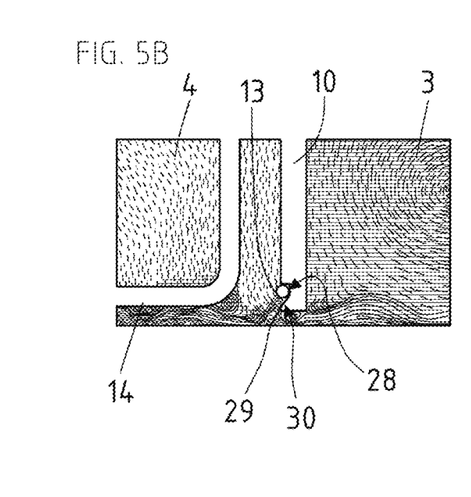
Figure 5C:
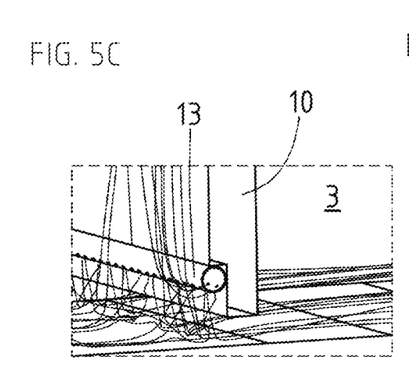
Figure 5D:
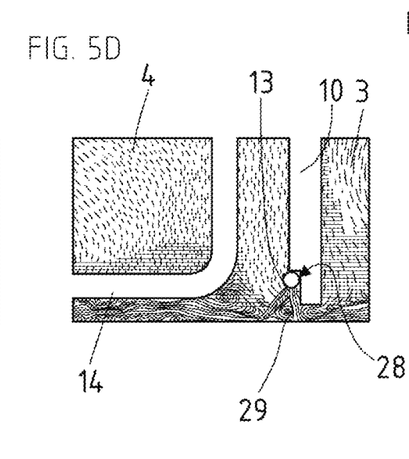
Figure 5E:
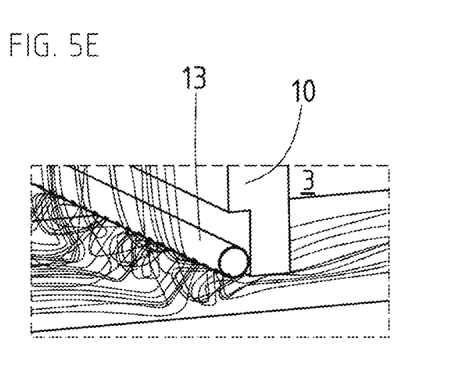
Figure 5F:
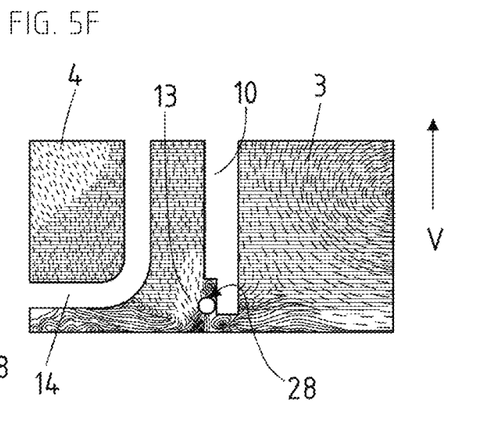

FIG. 4 shows a cross-section through a furnace 1 according to the disclosure. The steel sheet blank 5 is thereby arranged in part in the first zone 3 with the higher temperature T3 and in the second zone 4 with the relatively lower temperature T4. In the second zone 4 there can be formed a cooling system 14, for example in the form of a cooling tube. This can either feed cooling air to the second region 21 of the steel sheet blank 5 with the lower temperature and/or correspondingly emit a colder temperature. In order that an exact temperature in the transition region 22 of the steel sheet blank 5 can be established at the gap 11 and here at the separating wall 10, the tubular cooling nozzle 13 is here arranged in the form of a cooling tube directly next to the separating wall 10. The arrangement thereby takes place in the zone with the lower temperature. Optionally, a tubular cooling nozzle 13 can also likewise be arranged beneath the steel sheet blank 5. A geometrically exact transition region between the two regions with mutually different temperatures in the steel sheet blank 5 can thus be established.

FIG. 5A, FIG. 5B, FIG. 5C, FIG. 5D, FIG. 5E, and FIG. 5F each show a perspective view and a cross-sectional view of a flow pattern of the arrangement according to at least one embodiment of a tubular cooling nozzle 13. In each case based on the image plane, the warmer first zone 3 in the furnace 1 is shown on the right and the relatively colder zone 4 is shown on the left. In the region of the separating wall 10, the tubular cooling nozzle 13 in the form of a cooling tube, or of a tube, is in each case arranged with a tendency towards the colder zone. Furthermore, further outlet openings 27 are arranged at an angle thereto laterally emitting in the direction towards the cooler second zone 4, which outlet openings additionally emit a corresponding cooling jet 29 in the direction towards the second zone 4. A cooling tube for the cooling system 14 can further be arranged in the second zone 4.

In the separating wall 10 itself there is arranged at the lower end a shoulder 28, wherein the cooling tube itself is then positioned in the shoulder 28. It is possible, for example, according to FIG. 5B for an additional slope 30 to be arranged, which produces an initial deflection of the cooling jets 29 emerging vertically downwards. However, the cooling jets 29 emerging vertically downwards are in a large part guided in the direction towards the warmer first zone 3. The cooling jets 29 emerging through the additional lateral outlet opening 31 arranged at an angle, on the other hand, are guided away completely into the cooler zone. The surface cooling nozzle 14 thus produces linear surface cooling.

Figure 6:
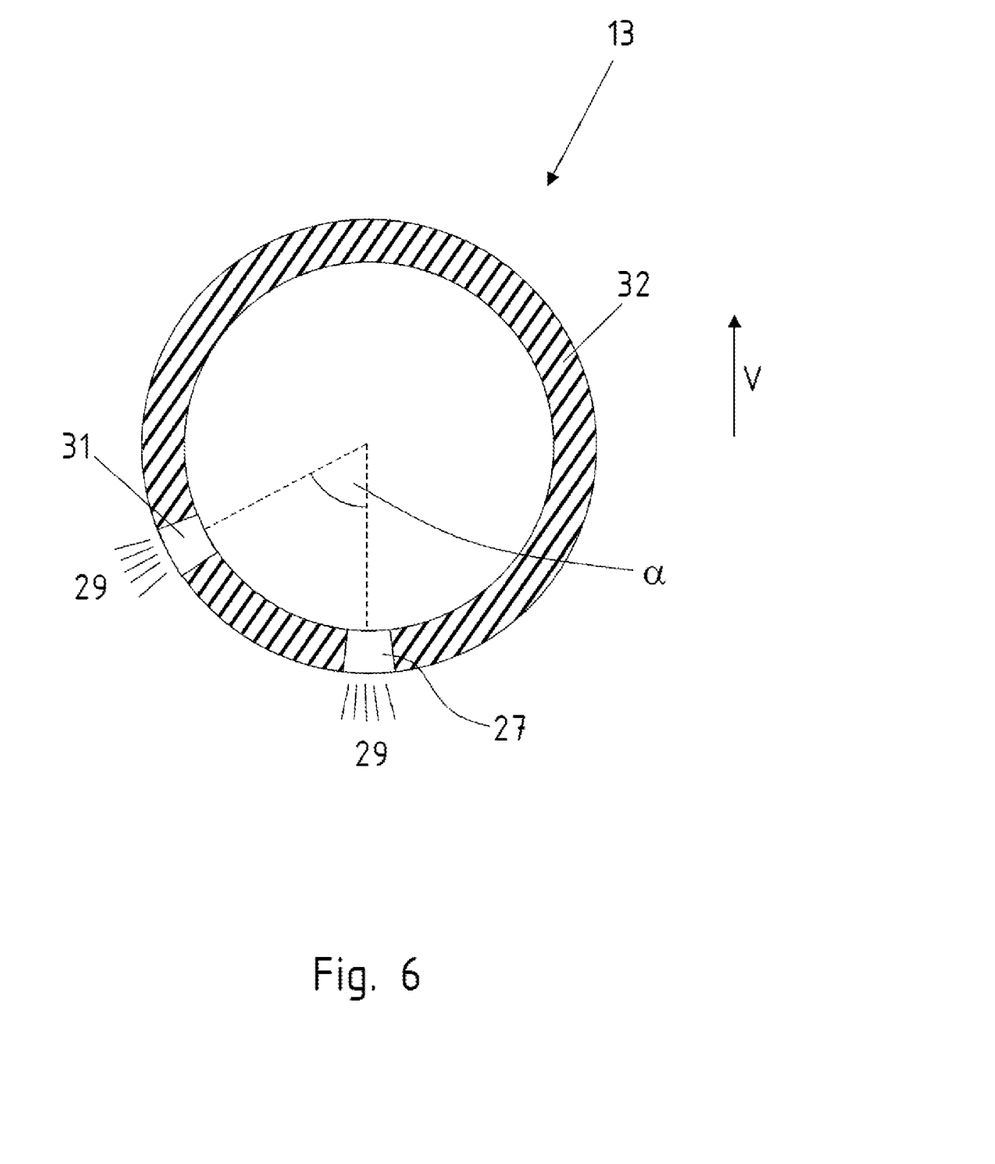
FIG. 6 shows a cross-section through a surface cooling nozzle in the form of a tube according to at least one embodiment.

FIG. 6 shows the tubular cooling nozzle 13 in the form of a tube 32 in cross-section. On the one hand there is shown, based on the vertical direction, and the lower outlet opening 27. Offset at an angle α thereto, further outlet openings 31 are arranged laterally. The angle α is between 0 and 90 degrees, between 20 and 40 degrees, or between 20 and 30 degrees. Further cooling jets 29 can be emitted by these additional outlet openings 31 in a purposively directed manner, on the one hand in the direction towards the cooler temperature zone, but at the same time also in the direction towards the steel sheet blank 5. Further outlet openings, not shown in detail, can be arranged between the outlet openings 27 and 31. Further outlet openings, not shown in detail, can also be arranged, based on the image plane, on the right hand side of the lower outlet opening 27.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A continuous furnace for the heat treatment of a sheet metal blank, the furnace comprising:
   a first zone and second zone, wherein the first zone has a higher temperature than the second zone,
   a separating wall between the first and second zones, wherein a gap is formed between the sheet metal blank and the separating wall,
   a tubular cooling nozzle arranged at or in the separating wall in a direction towards the second zone, wherein the tubular cooling nozzle has a first group of outlet openings pointing downwards in a vertical direction relative to the separating wall, and
   a surface cooling nozzle arranged in the second zone, wherein the separating wall is horizontally adjustable.

2. The continuous furnace according to claim 1, wherein the first zone has a temperature equal to or greater than an austenitization temperature of the sheet metal blank.

3. The continuous furnace according to claim 1, wherein the tubular cooling nozzle has a second group of outlet openings pointing at an angle offset from the first group of outlet openings.

4. The continuous furnace according to claim 1, wherein the tubular cooling nozzle is arranged in or at a lower end of the separating wall.

5. The continuous furnace according to claim 1, wherein the separating wall has a recess receiving therein the tubular cooling nozzle.

6. The continuous furnace according to claim 1, further comprising a body for heat removal arranged in the second zone.

7. The continuous furnace according to claim 1, further comprising a conveyor system arranged in the furnace.

8. The continuous furnace according to claim 7, wherein the conveyor system comprises at least one of (i) lifting beams or (ii) oscillating conveyors.

9. The continuous furnace according to claim 1, further comprising a pre-tempering zone, wherein the pre-tempering zone is separated from the first zone and the second zone by a further separating wall.

10. The continuous furnace according to claim 1, further comprising a lower separating wall arranged in the vertical direction beneath the sheet metal blank.

11. The continuous furnace according to claim 1, wherein the surface cooling nozzle is arranged in the vertical direction above the sheet metal blank, and the continuous furnace further comprises an additional surface cooling nozzle arranged in the second zone beneath the sheet metal blank.

12. The continuous furnace according to claim 1, wherein the tubular cooling nozzle is arranged at a horizontal distance of less than 50 mm from the gap.

13. The continuous furnace according to claim 1, wherein the separating wall has a shoulder receiving therein the tubular cooling nozzle.

14. The continuous furnace according to claim 1, wherein
   the separating wall extends along a transport direction in which the sheet metal blank is to be conveyed through the continuous furnace, and
   the separating wall separates the first zone from the second zone along a direction transverse to the transport direction.

15. The continuous furnace according to claim 1, wherein the separating wall is vertically adjustable.

16. A process of hot-forming and press-hardening a sheet metal blank using the continuous furnace according to claim 1, the process comprising:
   heating a sheet metal blank of a hardenable steel alloy to austenitize the steel alloy, and
   hot-forming and press-hardening the heated sheet metal blank in at least one cooled forming tool,
      wherein at a start of the hot-forming, the sheet metal blank has, as a result of the heating, a first surface portion having a first temperature above 800° C., a second surface portion having a second temperature above 550° C. but lower than the first temperature, and a transition region between the first and second surface portions, wherein the transition region is less than 100 mm.

17. The process according to claim 16, wherein the transition region is between 50 mm and less than 80 mm, with a position tolerance, based on a surface of the sheet metal blank, less than 30 mm.

18. The process according to claim 16, wherein
the sheet metal blank has a metallic precoat, and
the heating comprises fully alloying the precoat.

* * * * *